United States Patent
Gill

(10) Patent No.: US 6,788,501 B2
(45) Date of Patent: Sep. 7, 2004

(54) GMR READ HEAD HAVING A PINNED LAYER WITH AN ACTIVE PORTION OXIDIZED TO REDUCE THE MAGNETIC MOMENT THEREOF

(75) Inventor: Hardayal Singh Gill, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 10/254,411

(22) Filed: Sep. 24, 2002

(65) Prior Publication Data

US 2004/0057165 A1 Mar. 25, 2004

(51) Int. Cl.⁷ ................................................ G11B 5/39
(52) U.S. Cl. .................................................. 360/324.11
(58) Field of Search ......................... 360/324.1, 324.11, 360/324.12, 324.2, 317, 322

(56) References Cited

U.S. PATENT DOCUMENTS

| | | | |
|---|---|---|---|
| 5,446,613 A | 8/1995 | Rottmayer | 360/113 |
| 5,639,509 A | 6/1997 | Schemmel | 427/130 |
| 5,862,021 A * | 1/1999 | Deguchi et al. | 360/324.11 |
| 5,898,549 A * | 4/1999 | Gill | 360/324.11 |
| 6,090,498 A * | 7/2000 | Omata et al. | 428/692 |
| 6,108,177 A | 8/2000 | Gill | 360/324.12 |
| 6,387,285 B1 | 5/2002 | Sasaki | 216/38 |
| 6,388,845 B1 | 5/2002 | Sasaki | 360/317 |
| 6,519,121 B1 * | 2/2003 | Gill | 360/324.11 |
| 6,631,055 B2 * | 10/2003 | Childress et al. | 360/321 |
| 6,710,984 B1 * | 3/2004 | Yuasa et al. | 360/324.11 |
| 2001/0036046 A1 * | 11/2001 | Mizuguchi | 360/324.11 |
| 2004/0061985 A1 * | 4/2004 | McCord | 360/324.11 |

FOREIGN PATENT DOCUMENTS

| | | | | |
|---|---|---|---|---|
| EP | 0669607 | 8/1995 | | G11B/5/39 |
| JP | 11-110720 | 4/1999 | | G11B/5/39 |

OTHER PUBLICATIONS

Specification "Lead Overlaid Type of Sensor with Sensor Passive Regions Pinned", IBM Confidential.

* cited by examiner

Primary Examiner—Jefferson Evans
(74) Attorney, Agent, or Firm—Silicon Valley IP Group, PC; Dominic M. Kotab

(57) ABSTRACT

A magnetic head having a sensor with a free layer, a spacer layer coupled to the free layer, and a pinned layer coupled to the spacer layer. Each layer has an active portion defined between its end portions. Leads are coupled to the sensor, with each lead overlapping the end portions of the layers. The pinned layer is operative to substantially pin magnetic moments of the end portions of the free layer. The magnetic moment of the active portion of the pinned layer is oxidized to reduce its magnetic moment, allowing the magnetic moment of the active portion of the free layer to spin freely.

18 Claims, 3 Drawing Sheets

GMR READ HEAD HAVING A PINNED LAYER WITH AN ACTIVE PORTION OXIDIZED TO REDUCE THE MAGNETIC MOMENT THEREOF

FIELD OF THE INVENTION

The present invention relates to magnetic heads, and more particularly, this invention relates to lead overlay read heads having magnetically pinned passive regions.

BACKGROUND OF THE INVENTION

One well known way to increase the performance of hard disk drives is to increase the areal data storage density of the magnetic hard disk. This can be accomplished by reducing the written data track width, such that more tracks per inch can be written on the disk. To read data from a disk with a reduced track width, it is also necessary to develop sufficiently narrow read head components, such that unwanted magnetic field interference from adjacent data tracks is substantially eliminated.

The standard prior art read head elements include a plurality of thin film layers that are deposited and fabricated to produce a GMR read head, as is known to those skilled in the art. Significantly, where the width of the thin film layers that comprise the GMR read head is reduced below certain values, the magnetic properties of the layers are substantially compromised. To overcome this problem, GMR read heads have been developed in which the thin film layers have an ample width and the electrical leads are overlaid on top of portions of the thin film layers. This lead overlaid configuration has the effect of creating an active read head region having a width that is less than the entire width of the deposited layers, such that the magnetic properties of the thin film layers can be preserved. Thus, in the lead overlaid GMR read heads of the prior art, active magnetic layer portions exist between the electrical leads and passive magnetic layer portions exist beneath the electrical leads.

A problem that has been recognized with regard to such prior art lead overlaid read heads is that the passive region of the magnetic layers of the read head, and particularly the free magnetic layer, is not entirely passive. That is, external magnetic fields, such as from adjacent data tracks, create magnetic field fluctuation and noise within the passive regions of the free magnetic layer beneath the electrical leads. Thus, noise and side reading effects continue to be a problem with lead overlaid GMR read heads.

Further, prior art heads have hard bias material on either side of the sensor to exert magnetic force on the free layer to magnetically stabilize the free layer. The problem is that hard bias layers are very thick, and as track sizes shrink, sensors must get smaller. When the track width becomes very narrow, the hard bias layers makes the free layer very insensitive and thus less effective. What is needed is a way to create a sensor with a narrow track width, yet with a free layer that is very sensitive The present invention seeks to solve the aforementioned problems by pinning the magnetization of the free magnetic layer in the passive regions beneath the overlaid electrical leads, thus stabilizing the passive regions, and reducing noise and side reading effects. The embodiments of the present invention provides a sensor with sensitivity that is greatly enhanced over sensors of comparable track width created using prior art methods.

SUMMARY OF THE INVENTION

The present invention overcomes the drawbacks and limitations described above by providing a magnetic head having a sensor with a free layer, a spacer layer coupled to the free layer, and a pinned layer coupled to the spacer layer. Each layer has an active portion defined between its end portions. The active portion should correspond roughly to the track width of the media. Leads are coupled to the sensor, with each lead overlapping the end portions of the layers. Preferably, each lead tapers towards the sensor.

The pinned layer is operative to substantially pin magnetic moments of the end portions of the free layer, thereby essentially desensitizing the end portions of the free layer and making hard bias elements unnecessary in this structure. Preferably, the magnetic moments of the end portions of the free layer are antiparallel to moments of the end portions of the pinned layer.

The magnetic moment of the active portion of the pinned layer is less than the magnetic moments of the end portions of the pinned layer, allowing the magnetic moment of the active portion of the free layer to spin freely. The magnetic moment of the active portion of the pinned layer can be reduced by oxidizing that portion of the pinned layer.

Preferably, the free layer and/or the pinned layer are composed of at least FeN. Also preferably, the spacer layer includes at least Cr.

A thickness of the pinned layer in a direction perpendicular to the adjoining surfaces of the pinned layer and the spacer layer is preferably less than a thickness of the free layer in a direction perpendicular to the adjoining surfaces of the pinned layer and the spacer layer. Ideally, the thickness of the pinned layer is less than 75% of the thickness of the free layer, and is possible because of the high magnetic moment of FeN. This provides a great advantage over the prior art in that head size is significantly reduced.

The magnetic head may also include a write portion coupled to the sensor.

To create a head having the structure described above, several layers are deposited to form a sensor. The layers include a free layer, a pinned layer, and a spacer layer between the free layer and pinned layer. Leads are coupled to the sensor (such as by depositing the leads) such that each lead overlaps opposite end portions of the layers. An active portion of the pinned layer is oxidized for reducing its magnetic moment and electrical conductivity, where the active portion is defined between the end portions of the pinned layer. Additional layers may also be added.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
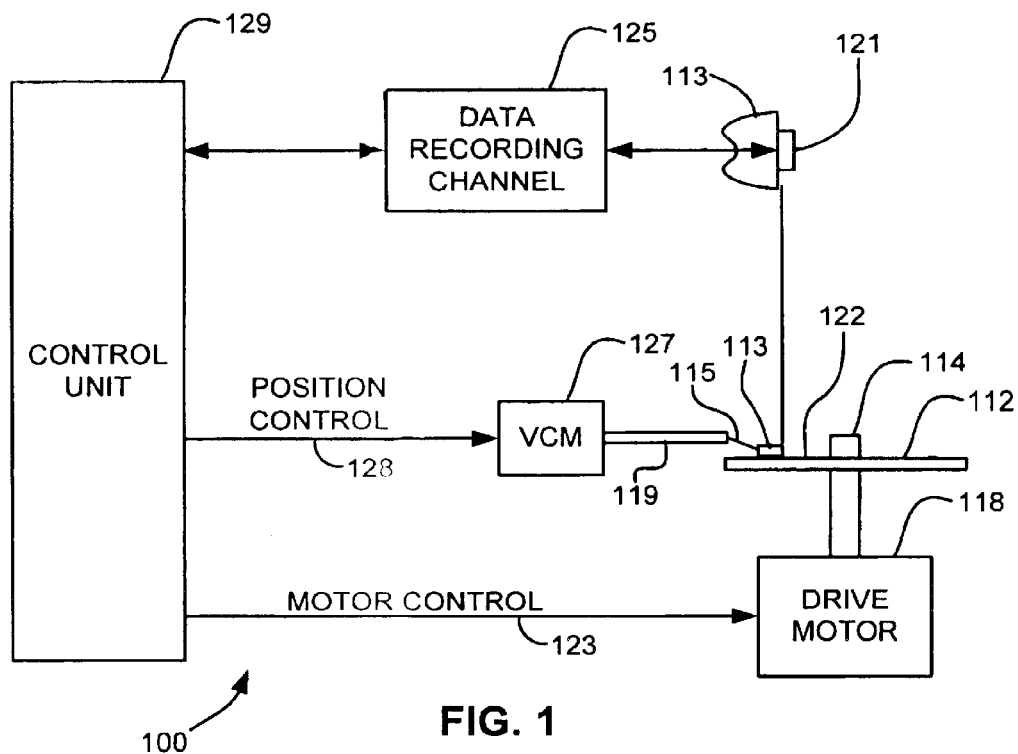
FIG. 1 is a perspective drawing of a magnetic disk drive system in accordance with one embodiment.

Referring now to FIG. 1, there is shown a disk drive 100 embodying the present invention. As shown in FIG. 1, at least one rotatable magnetic disk 112 is supported on a spindle 114 and rotated by a disk drive motor 118. The magnetic recording media on each disk is in the form of an annular pattern of concentric data tracks (not shown) on disk 112.

At least one slider 113 is positioned on the disk 112, each slider 113 supporting one or more magnetic read/write heads 121. More information regarding such heads 121 will be set forth hereinafter during reference to FIG. 4. As the disks rotate, slider 113 is moved radially in and out over disk surface 122 so that heads 121 may access different tracks of the disk where desired data are recorded. Each slider 113 is attached to an actuator arm 119 by means way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 are for representation purposes only. It should be apparent that disk storage systems may contain a large number of disks and actuators, and each actuator may support a number of sliders.

Figure 2:
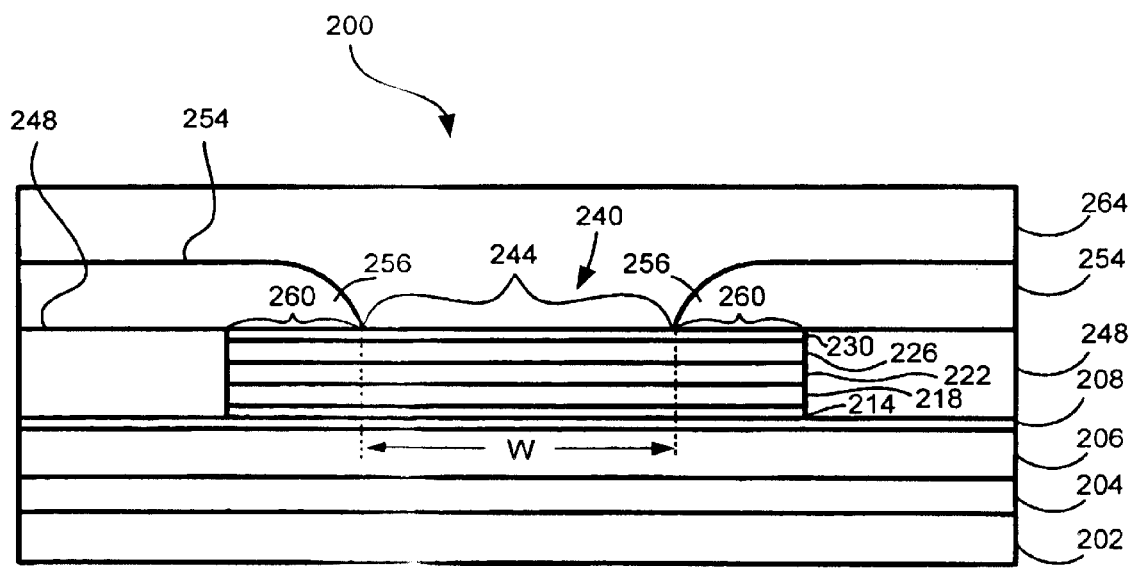
FIG. 2 is a side cross-sectional view of a prior art lead overlaid read head portion of a magnetic head.

FIG. 2 is a side cross-sectional view of a prior art electrical lead overlaid read head portion of a magnetic head 200. As depicted therein, the prior art lead overlaid read head generally includes a substrate base 202 that constitutes the material from which the magnetic head is fabricated, such as aluminum titanium carbide. A first magnetic shield 204 is fabricated on the substrate, and an insulation layer 206, typically composed of aluminum oxide, is fabricated upon the magnetic shield 204. A seed layer 208 is deposited upon the insulation layer 206 and a series of thin film layers are sequentially deposited upon the seed layer 208 to form a GMR read head. In this structure, the layers generally include an antiferromagnetic layer 214, a pinned magnetic layer 218 that is deposited upon the anti ferromagnetic layer 214, a spacer layer 222 that is deposited upon the pinned magnetic layer 218, a free magnetic layer 226 that is deposited upon the spacer layer 222 and a cap layer 230 that is deposited upon the free magnetic layer 226. Typically, the antiferromagnetic layer 214 may be composed of PtMn, the pinned magnetic layer 218 may be composed of CoFe, the spacer layer 222 may be composed of Cu, the free magnetic layer 226 may be composed of CoFe and the cap layer 230 may be composed of Ta.

Following the deposition of the GMR read head layers 214-230, a patterned etching process is conducted such that only central regions 240 of the layers 214-230 remain. Thereafter, hard bias elements 248 are deposited on each side of the central regions 240. Following the deposition of the hard bias elements 248, electrical lead elements 254 are fabricated on top of the hard bias elements 248. As depicted in FIG. 2, inner ends 256 of the leads 254 are overlaid on top of outer portions 260 of the layers 214-230 of the central read head layer regions 240. A second insulation layer 264 is fabricated on top of the electrical leads 254 and cap layer 230, followed by the fabrication of a second magnetic shield (not shown) and further components that are well known to those skilled in the art for fabricating a complete magnetic head.

A significant feature of the prior art lead overlaid GMR read head depicted in FIG. 2 is that the portion of the central layer region 240 which substantially defines the track reading width W of the read head 200 is the central portion 244 of the read head layer regions 240 that is disposed between the inner ends 256 of the electrical leads 254. That is, because the electrical current flows through the read head layers between the electrical leads 254, the active portion 244 of the read head layers comprises the width w between the inner ends 256 of the electrical leads 254. The outer portions 260 of the read head layers disposed beneath the overlaid inner ends 256 of the electrical leads 254 are somewhat passive in that electrical current between the electrical leads 254 does not pass through them.

A significant problem with the prior art lead overlaid read head 200 depicted in FIG. 2 is that the magnetization in the outer portions 260 of the free layer 226 beneath the electrical leads 254 is unstable and subject to unwanted magnetic field fluctuations. Additionally, side reading effects from adjacent data tracks as well as magnetic noise is created in the passive portions 260 of the free layer 226 beneath the electrical lead ends 256. Thus, noise and side reading effects continue to be a problem with lead overlaid GMR read heads.

Figure 3:
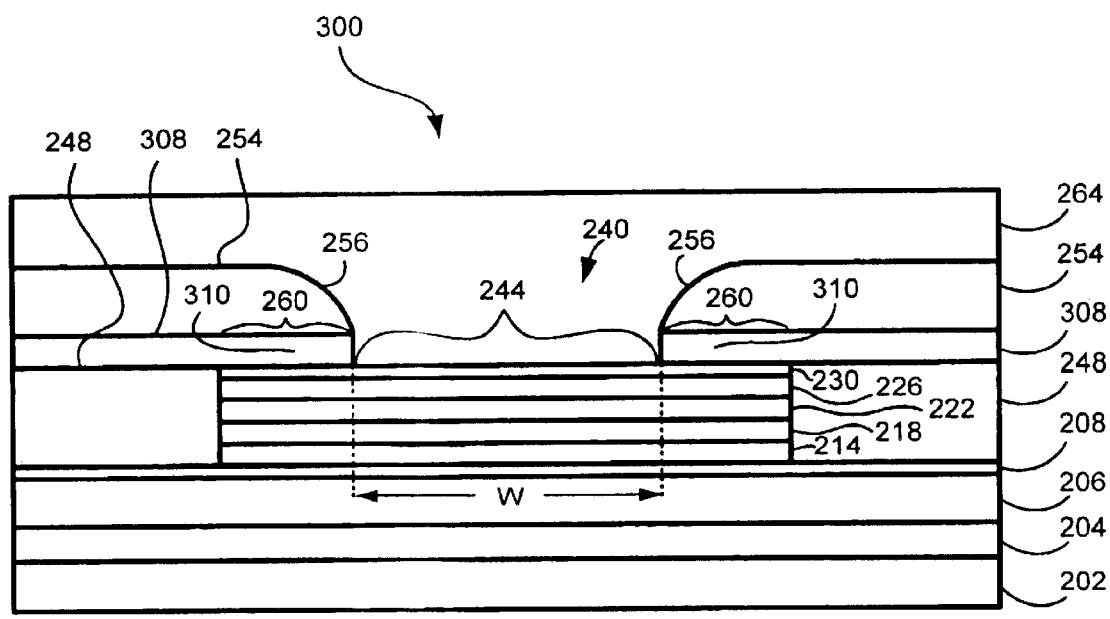
FIG. 3 is a side cross-sectional view of another prior art lead overlaid read head portion of a magnetic head.

FIG. 3 depicts another prior art lead overlaid read head 300. As depicted therein, the read head 300 includes a GMR read head thin film element 240, as well as the hard bias elements 248. This read head 300 includes an additional magnetic thin film layer 308 that is deposited on top of the hard bias elements 248, such that an inner portion 310 of the layer 308 extends over the outer portions 260 of the layers that comprise the read head element 240. The magnetic layer 308 is deposited on top of the outer portions 260 of the tantalum cap layer 230, and directly on top of the magnetic hard bias elements 248. The electrical leads 254 are thereafter fabricated on top of the magnetic layer 308.

Following the magnetic field initialization of the hard bias elements 248, the magnetic field of the hard bias elements 248 will create corresponding magnetic fields within the magnetic layer 308. Furthermore, because the inner portion 310 of the magnetic layer 308 is deposited on top of the outer portion 260 of the tantalum cap layer 230, which is deposited above the outer portion 260 of the free layer 226, the magnetic field within the inner portion 310 of the magnetic layer 308 will become magnetostatically coupled to the outer portion 260 of the free layer 226 through the tantalum cap layer 230. This provides a pinning effect upon the magnetic fields within the outer portion 260 of the free layer, because it raises the coercivity of the free layer within the outer region 260.

One drawback of the configuration depicted in FIG. 3 is that the additional layer 308 adds to the thickness of the head. Further, an additional processing step is required to add the magnetic layer 308.

Another drawback is that the prior art read heads 200,300 of FIGS. 2–3 require hard bias elements 248. As track sizes shrink, sensors must get smaller. The smaller the sensor becomes, the more susceptible it is to interference from the hard bias elements 248. When the track width becomes very narrow, the hard bias elements 248 make the free layer very insensitive and thus less effective.

Figure 4:
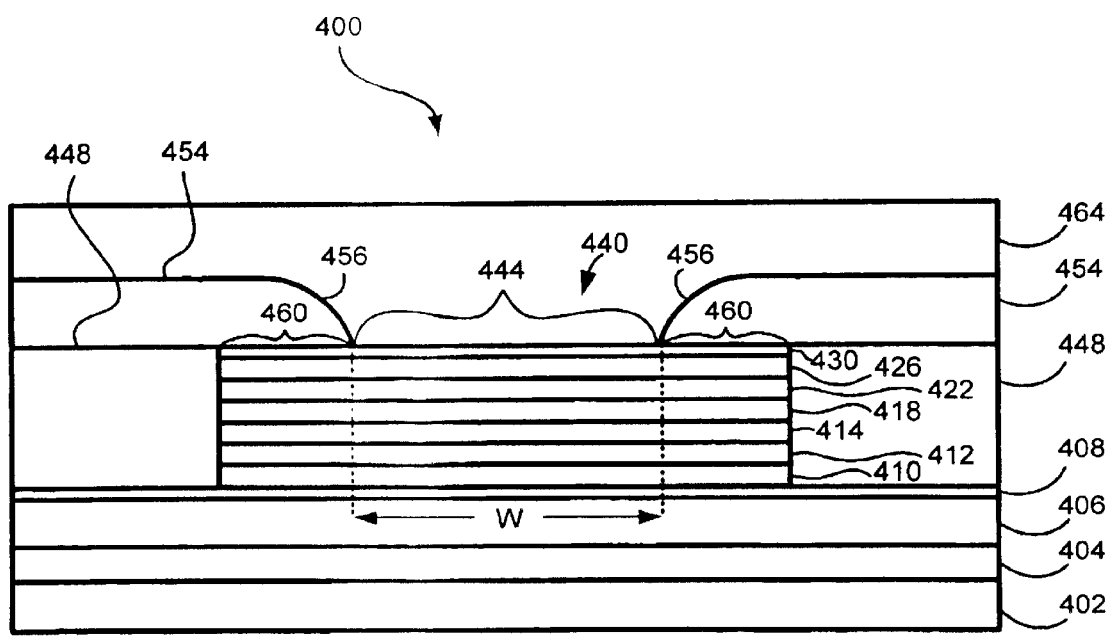
FIG. 4 is a side cross-sectional view of a first preferred embodiment of a lead overlaid read head portion of a magnetic head of the present invention.
Figure 5:
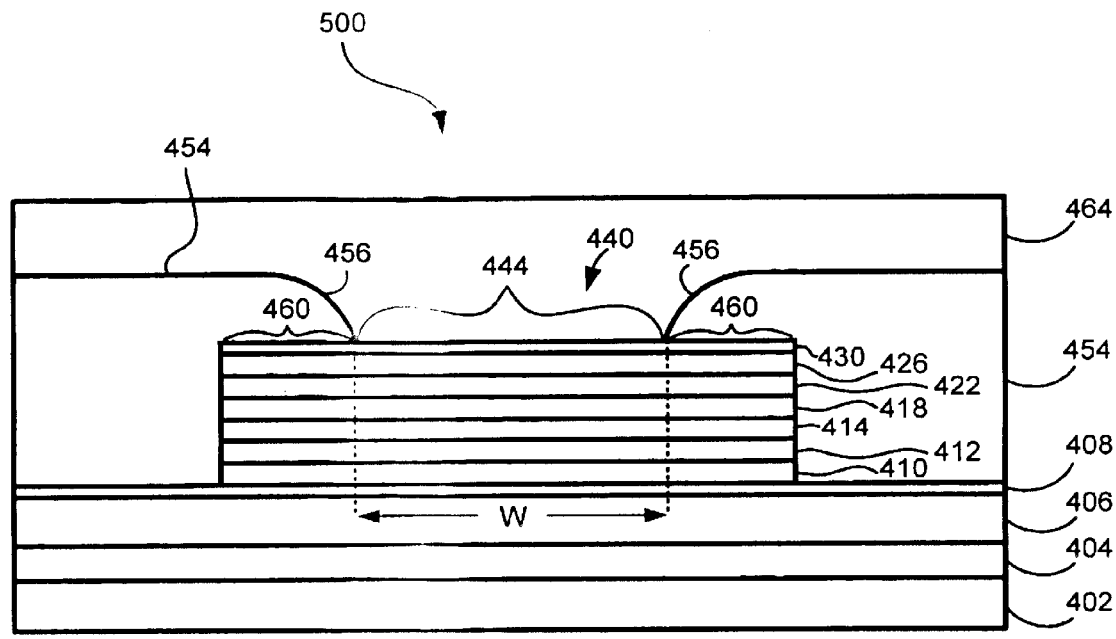
FIG. 5 is a side cross-sectional view of a second preferred embodiment of a lead overlaid read head portion of a magnetic head of the present invention.
Figure 6:
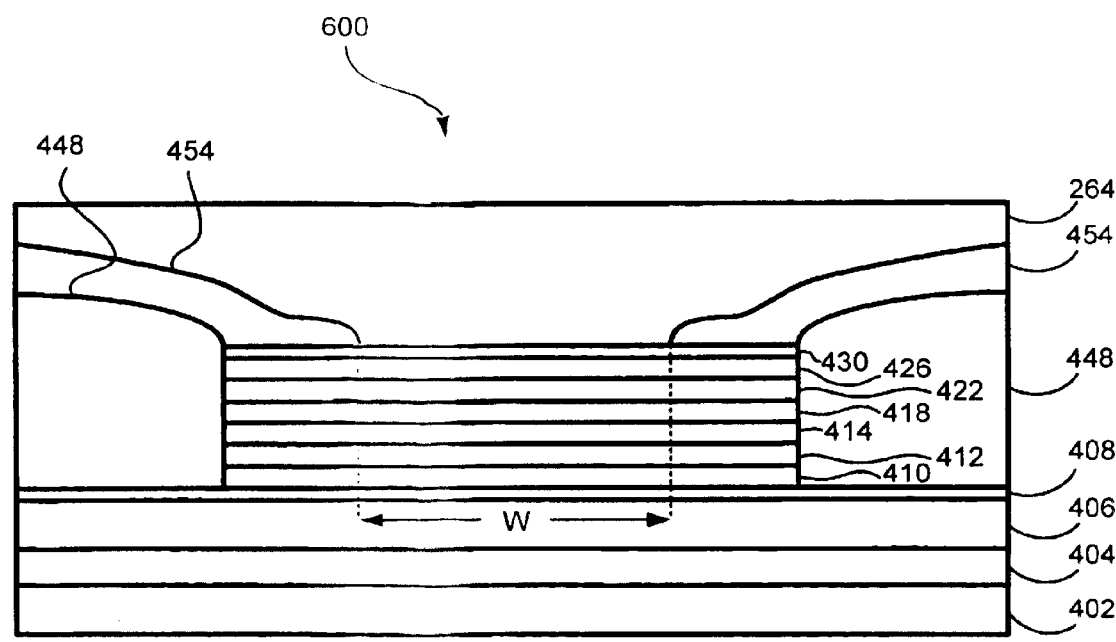
FIG. 6 is a side cross-sectional view of a third preferred embodiment of a lead overlaid read head portion of a magnetic head of the present invention.

The embodiments of the present invention described below with reference to FIGS. 4–6 provide better characteristics with fewer layers. These embodiments describe sensors with higher sensitivities than prior art sensors of comparable track reading width W.

FIG. 4 illustrates a lead overlaid read head 400 according to one preferred embodiment. As shown, the read head 400 includes a substrate base 402, a first magnetic shield 404 fabricated on the substrate, and an insulation layer 406 fabricated upon the magnetic shield 404. A seed layer 408 is deposited upon the insulation layer 406 and a series of thin film layers are sequentially deposited upon the seed layer 408 to form a GMR read head. In the preferred embodiment of the present invention, the layers generally include an antiferromagnetic layer 410, a lower pinned layer 412, a first spacer layer 414, a free magnetic layer 418 that is deposited upon the first spacer layer 414, a second spacer layer 422 that is deposited upon the free layer 418, a pinned magnetic layer 426 that is deposited upon the second spacer layer 422 and a cap layer 430 that is deposited upon the pinned layer 426.

The first spacer layer 414 may be composed of Cu, the free layer 418 may be composed of CoFe, NiFe, FeN, etc. The second spacer layer 422 may be composed of Cr, the pinned layer 426 may be composed of NiFe or FeN and the cap layer 430 may be composed of Ta. A preferred list of materials is provided below.

Whatever combination of materials is used, the magnetic moments of the free and pinned layers should be antiparallel. This can be achieved, for example by using Cr for the second spacer in a thickness about less than about 10 Å. The portion of the pinned layer 426 in the active area 444 is oxidized to reduce its magnetic properties, thereby allowing the free layer 418 in the active area to spin freely. This allows the head to read track widths in the sub-micron range. Further, each overlap portion 460 can be much longer than the active portion 444 because the antiparallel coupling makes the overlap portions 460 insensitive.

Referring again to FIG. 4, following the deposition of the GMR read head layers 410–430, a patterned etching process is conducted such that only central regions 440 of the layers 410–430 remain. Following the etching, a filler 448 such as aluminum oxide is deposited on each side of the central regions. Note the distinction between the structure of the head 200 of FIG. 2, which requires hard bias elements, and the head 400 of FIG. 4, which does not. Thus, the head 400 of FIG. 4 is not susceptible to hard bias interference and therefore the active area 444 of the head 400 can have a very narrow track reading width W. Further, manufacturing costs and times are reduced by using filler.

Following the deposition of the filler 448, electrical lead elements 454 are fabricated on top of the filler 448 such that inner ends 256 of the leads 454 are overlaid on top of outer portions 460 of the layers 410–430 of the central read head layer regions 440. These outer portions can be referred to as antiparallel tabs.

Once the electrical lead elements 454 are added, they can be used as a mask. The cap layer 430 between the electrical lead elements 454 is removed by etching. After removing the cap layer 430, the exposed portion of the pinned layer 426 is oxidized by any suitable method. For example, if the pinned layer 426 is FeN, the result after oxidation is iron oxide ($FeO_x$). The oxidized portion of the pinned layer 426 is magnetically inactive, having essentially no magnetic moment. The free layer 418 is thus able to spin freely in the active area 444, but is pinned in the overlap regions 460. This provides a further advantage, in that the oxidized portion of the pinned layer 426 is also electrically resistive, and it is desirable to prevent flow of electricity through the pinned layer 426 because of the resulting insensitivity. This configuration allows current to essentially flow only through the free layer 418.

Keep in mind that it is desirable to avoid oxidation of the free layer. During the oxidation step, the Cr second spacer layer 422 acts as a barrier to some extent.

With continued reference to FIG. 4, the portion of the cap layer 430 removed for oxidation of the pinned layer 426 can be replaced. A second insulation layer 464 is fabricated on top of the electrical leads 454 and cap layer 430, followed by the fabrication of a second magnetic shield (not shown) and further components, such as a write portion, that are well known to those skilled in the art for fabricating a complete magnetic head.

FIG. 5 depicts an alternate embodiment 500 in which the electrical lead elements 454 are deposited adjacent the layers 410–430, thereby saving an additional processing step, namely that of depositing filler. Note that a nonconductive material (not shown) can be deposited between the side edges of the layers 410–430 and the electrical lead elements 454.

FIG. 6 depicts yet another magnetic head 600 in which the electrical lead elements 454 are tapered towards the sensor. If the electrical lead elements 454 are too thick, they create an electric contact (i.e., short) to the shield (not shown). This in turn interferes with head performance. The embodiment shown in FIG. 6 provides a thin electrical lead element 454 near the sensor. The dimensions of the electrical lead element 454 may increase away from the sensor.

In a preferred embodiment, the first spacer layer 414 is composed of Cu and the free layer 418 is composed of CoFe and FeN. The second spacer layer 422 is composed of Cr 8–10 Å thick. Cr is preferred because when a thin Cr layer is placed between two ferromagnetic layers, the magnetic moments of the layers become antiparallel. The pinned layer 426 is composed of FeN, and the cap layer 230 is composed of Ta. The pinned layer 426 is preferably mostly Fe with a small amount of N, e.g., 2–5%.

FeN is the preferred material for several reasons, though other materials such as NiFe can also be used. One reason FeN is the preferred material is because it oxidizes faster than NiFe and so the pinned layer can be oxidized without oxidation of the free layer.

Magnetically, the layers 418,426 require a certain thickness to be effective. If NiFe is used for the pinned layer 426, the pinned layer 426 is about 25% thicker (as measured between the Cr and Ta layers 422,430) than the free layer 418. For example, if the free layer 218 is about 30 Å, the pinned layer 426 is about 37 to 40 Å. FeN has about twice the magnetic moment of NiFe. Because FeN has twice the moment, an FeN pinned layer 426 need only be half as thick as a layer of NiFe. Thus, in the foregoing example, the FeN pinned layer would only need to be about 15–20 Å thick. A preferred thickness of the pinned layer 426 is 50–80% less than the thickness of the free layer 418.

Also, as mentioned above, it is desirable to avoid oxidation of the free layer 218. The thinner FeN pinned layer 426 is easier to oxidize, and oxidizes faster. Both of these make it safer to use without disturbing the free layer 418.

While various embodiments have been described above, it should be understood that they have been presented by way of example only, and not limitation. For example, the structures and methodologies presented herein are generic in their application to all MR heads, AMR heads, GMR heads, spin valve heads, etc. Thus, the breadth and scope of a preferred embodiment should not be limited by any of the above-described exemplary embodiments, but should be defined only in accordance with the following claims and their equivalents.

What is claimed is:

1. A magnetic head, comprising:
    a sensor having a free layer, a spacer layer coupled to the free layer, and a pinned layer coupled to the spacer layer, each layer having an active portion defined between end portions thereof;
    leads coupled to the sensor, wherein each lead overlaps the end portions of the layers;
    wherein the pinned layer is operative to substantially pin magnetic moments of the end portions of the free layer;
    wherein a magnetic moment of the active portion of the pinned layer is less than magnetic moments of the end portions of the pinned layer.

2. The magnetic head as recited in claim 1, wherein at least one of the free layer and the pinned layer includes at least FeN.

3. The magnetic head as recited in claim 2, wherein the spacer layer includes at least Cr.

4. The magnetic head as recited in claim 2, wherein the active portion of the pinned layer is oxidized for reducing a magnetic moment thereof.

5. The magnetic head as recited in claim 1, wherein a thickness of the pinned layer in a direction perpendicular to adjoining surfaces of the pinned layer and the spacer layer is less than a thickness of the free layer in a same direction.

6. The magnetic head as recited in claim 5, wherein the thickness of the pinned layer is less than 75% of the thickness of the free layer.

7. The magnetic head as recited in claim 1, wherein the magnetic head has no hard bias elements.

8. The magnetic head as recited in claim 1, wherein the leads taper towards the sensor.

9. The magnetic head as recited in claim 1, wherein the magnetic moments of the end portions of the free layer are antiparallel to moments of the end portions of the pinned layer.

10. The magnetic head as recited in claim 1, and further comprising a write portion.

11. A method for creating a magnetic head, the method comprising:
    depositing a free layer, a pinned layer, and a spacer layer between the free layer and pinned layer for forming a sensor in which the magnetic moments of end portions of the free layer are antiparallel to magnetic moments of end portions of the pinned layer;
    coupling leads to the sensor, wherein each lead overlaps opposite end portions of the layers;
    oxidizing an active portion of the pinned layer for reducing a magnetic moment thereof, the active portion being defined between the end portions of the pinned layer.

12. The method as in claim 11, wherein at least one of the free layer and the pinned layer includes at least FeN.

13. The method as recited in claim 12, wherein the spacer layer includes at least Cr.

14. The method as recited in claim 11, wherein a thickness of the pinned layer in a direction perpendicular to the adjoining surfaces of the pinned layer and the spacer layer is less than a thickness of the free layer in a same direction.

15. The method as recited in claim 14, wherein the thickness of the pinned layer is less than 75% of the thickness of the free layer.

16. The method as recited in claim 11, wherein the magnetic head created by the method has no hard bias elements.

17. The method as recited in claim 11, wherein the leads taper towards the sensor.

18. A magnetic storage system, comprising:
    magnetic media;
    at least one head for reading from and writing to the magnetic media, each head having:
        a sensor including a free layer, a spacer layer, and a pinned layer; wherein magnetic moments of end portions of the free layer are antiparallel to magnetic moments of end portions of the pinned layer, wherein a magnetic moment of a central portion of the pinned layer is less than the magnetic moment of the end portions of the pinned layer;
        a write element coupled to the read portion; and
    a slider for supporting the head; and
    a control unit coupled to the head for controlling operation of the head.

* * * * *